(12) United States Patent
Ohmori et al.

(10) Patent No.: US 7,110,133 B2
(45) Date of Patent: Sep. 19, 2006

(54) COMMUNICATION APPARATUS AND IMAGE COMMUNICATION METHOD

(75) Inventors: Masatake Ohmori, Kanagawa (JP); Kazumasa Koike, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 790 days.

(21) Appl. No.: 10/230,532

(22) Filed: Aug. 29, 2002

(65) Prior Publication Data

US 2003/0067626 A1 Apr. 10, 2003

(30) Foreign Application Priority Data

| Aug. 30, 2001 | (JP) | ............................. 2001-261678 |
| Aug. 30, 2001 | (JP) | ............................. 2001-261679 |
| Jul. 23, 2002 | (JP) | ............................. 2002-213787 |

(51) Int. Cl.
*G06F 3/12* (2006.01)

(52) U.S. Cl. ........................ 358/1.15; 358/1.9; 345/603

(58) Field of Classification Search ................ 358/1.9, 358/518; 347/43; 399/85; 345/603
See application file for complete search history.

(56) References Cited

U.S. PATENT DOCUMENTS

| 4,965,745 | A | * | 10/1990 | Economy et al. ........... 345/592 |
| 5,231,519 | A | | 7/1993 | Koike ........................ 358/3.07 |
| 5,243,445 | A | | 9/1993 | Koike ........................ 358/462 |
| 5,386,301 | A | | 1/1995 | Yuasa et al. ................ 358/445 |
| 5,408,338 | A | | 4/1995 | Koike ........................ 358/448 |
| 5,452,107 | A | | 9/1995 | Koike ........................ 358/468 |
| 5,550,647 | A | | 8/1996 | Koike ........................ 358/3.03 |
| 5,572,603 | A | | 11/1996 | Koike ........................ 382/199 |
| 5,706,096 | A | | 1/1998 | Koike ........................ 382/239 |
| 5,724,158 | A | | 3/1998 | Koike ........................ 358/462 |
| 5,815,605 | A | | 9/1998 | Koike ........................ 382/269 |
| 5,818,032 | A | * | 10/1998 | Sun et al. ................... 235/494 |
| 5,881,173 | A | | 3/1999 | Ohmori ...................... 382/232 |
| 6,005,673 | A | | 12/1999 | Murai et al. ................ 358/434 |
| 6,160,640 | A | | 12/2000 | Ohmori ...................... 358/474 |
| 6,229,927 | B1 | | 5/2001 | Schwartz .................... 382/248 |
| 6,278,529 | B1 | * | 8/2001 | Akimoto ..................... 358/1.9 |
| 2001/0033399 | A1 | * | 10/2001 | Kashioka .................... 358/518 |
| 2002/0037102 | A1 | * | 3/2002 | Toda .......................... 382/168 |
| 2002/0051148 | A1 | * | 5/2002 | Izumi ......................... 358/1.9 |
| 2002/0051259 | A1 | * | 5/2002 | Yasunobu .................... 358/518 |
| 2003/0059121 | A1 | * | 3/2003 | Savakis et al. ............. 382/239 |

FOREIGN PATENT DOCUMENTS

EP 0946052 A1 9/1999

OTHER PUBLICATIONS

Pennebakes and Mitchell, JPEG: Still Image Data Compression Standard, 1993, pp. 14-15, 20, 23-25, 326, 329, 342 and 344-345.*
U.S. Patent Appl. No. 061,687 of Koike, filed May 17, 1993.
U.S. Patent Appl. No. 091,573 of Koike, filed Jul. 15, 1993.
U.S. Patent Appl. No. 426,569 of Koike, filed Apr. 21, 1997.

(Continued)

*Primary Examiner*—Mark Zimmerman
*Assistant Examiner*—Vincent M. Rudolph
(74) *Attorney, Agent, or Firm*—Cooper & Dunham LLP

(57) ABSTRACT

A facsimile machine reads an image and stored the image data. The facsimile machine then receives information from the destination device on the image processing capabilities of the destination device. The facsimile machine performs color space conversion of the image data based on the image processing capabilities of the destination device before establishing a connection with the destination device, establishes a connection with the destination device and transmits the color space converted the image data to the destination device.

25 Claims, 12 Drawing Sheets

OTHER PUBLICATIONS

U.S. Patent Appl. No. 349,770 of Koike, filed Jul. 9, 1999.
U.S. Appl. No. 09/919,570 of Ohmori, filed Jul. 31, 2001.
U.S. Appl. No. 10/010,875 of Ohmori, filed Nov. 12, 2001.
Dec. 2, 2003 official Communication and European Search Report.
XP 001097353, Matthew Anderson et al. "Proposal for a Standard Default Color Space for the Internet-sRGB", The Fourth Color Imaging Conference: Color Science, Systems and Applications, pp. 238-246.

XP 000299526, Adriaan Ligtenberg, (1990) "The Emerging Compression Standard for Continuous Tone Images and Its Potential for Color Fax", Proceedings of the Asilomar Conference on Signals, Systems and Computers, pp. 876-880.

Finlayson, G.D. and Hordley, S.D., "Color Constancy at a Pixel", Journal of the Optical Society of America, vol. 18, No. 2, pp. 253-264, Feb. 2001.

* cited by examiner

COMMUNICATION APPARATUS AND IMAGE COMMUNICATION METHOD

BACKGROUND OF THE INVENTION

1) Field of the Invention

The present invention relates to an image communication apparatus that reads a color image and encodes data associated with the read color image before transmission to a destination.

2) Description of the Related Art

Recently, a facsimile machine having functions for reading and printing color images or a facsimile machine capable of transmitting and receiving color image data (color facsimile machine) has been widespread.

When the color facsimile machine is employed to transmit a color image in the art, read digital RGB signals (multi-valued data of R, G, B) are converted into color image data L*, a*, b* in LAB space and compressed before transmission to the destination.

When the color facsimile machine is employed to transmit an image, a color image is sent to the destination when it is a color facsimile machine. A monochromic image (binary image) is sent to the destination facsimile machine when it is a facsimile machine that has a function only for transmitting and receiving monochromic images (monochromic facsimile machine).

The transmission may be performed by the memory transmission. In the memory transmission, a draft image is read, a connection with the destination facsimile machine is established, information on different functions provided in that facsimile machine is acquired, and the draft image is transmitted.

FIG. 11 is a functional block diagram that shows a conventional image communication device 9. The image communication device 9 comprises a scanner 901, an A/D converter 902, a video compensator 903, an image quality processor 904, a transmission image generator 905, a coder 906, a storage section 907, a communicator 908 and a controller 909. This image communication device 9 is a color facsimile machine that has a network scanner function for compatibly connecting to a telephone line as well as to a LAN.

An operation of the image communication device 9 to perform color space conversion will be explained below with reference to the flowchart shown in FIG. 12. The scanner 901 reads a color draft image and generates analog RGB signals (step S901). The A/D converter 902 converts the analog RGB signals into digital RGB signals (multi-valued digital data of R, G, B) (step S902). The video compensator 903 performs shading compensation (step S903). The image quality processor 904 performs edge emphasis by a filtering operation (step S904).

Through the use of the color space conversion function of the transmission image generator 905, the digital RGB signals or color image data R, G, B in the digital RGB space are converted into color image data L*, a*, b* in LAB space (ITU-T standard data format for image communication devices) (the first color space conversion, S905).

The coder 906 converts (encodes) the color image data L*, a*, b* into JPEG image data (step S906). The storage 907 temporarily stores the JPEG image data (step S907).

The transmission image generator 905 has a transmission button; and when that transmission button is pressed down, the communicator 908 establishes a connection to the destination image communication device. The controller 909 can acquire information on a transmission resolution as well as information on the destination image communication device. The information on the destination image communication device is the information that indicates whether the destination is a device having a function for processing color image data in LAB space (generally an image communication device of a telephone line connection type) or a device (image communication device) of a network connection type having a function for processing color image data in sRGB space such as an Internet facsimile machine. This information acquirement is performed when the communicator 908 establishes a connection to the destination image communication device.

The controller 909 confirms whether a resolution conversion or a color space conversion is required according to the destination image communication device (step S908). When these conversions according to the destination are not required, JPEG image data stored in the storage 907 is transmitted to the destination image communication device by the communicator 908 (step S915).

When the resolution conversion or the color space conversion is required, the coder 906 decodes the coded data (step S909). First, when the color space conversion is required (step S910), through the use of the color space conversion function of the transmission image generator 905, LAB color space is converted into sRGB color space according to the destination image communication device (the second color space conversion, S911). When the resolution conversion is required (step S912), the transmission image generator 906 performs conversion of the resolution according to the destination (step S913). Then, the coder 906 re-encodes the color image data in sRGB color space to JPEG mode (step S914). The communicator 908 transmits the color image data thus re-encoded to the destination image communication device (step S915).

As for the memory transmission, it is not obvious before image reading when the destination is a color facsimile machine or a monochromatic facsimile machine. Therefore, the source color facsimile machine reads a draft image in a color mode and accumulates it in a memory unit. Then, after completion of connection to the destination facsimile machine, the color image data accumulated in the memory unit is sent when the facsimile machine is a color facsimile machine. In contrary, when it is a monochromatic facsimile machine, the color image data is converted into binary image data before it is transmitted.

When the destination image communication device is an image communication device of a network connection type such as an Internet facsimile (a device having a function for processing color image data in sRGB space), the image communication device 9 shown in FIG. 11 performs color space conversions twice in total, (1) a conversion from RGB color space into LAB color space by the scanner 901 at the time of reading a draft, and (2) a conversion from LAB into sRGB by the communicator 908 at the time of transmitting color image data.

As a result, an operational error due to the color space conversions (color space conversion operational error) increases and causes image quality deterioration such as variations in the color tone. In particular, when hardware is employed to configure the color space conversion function of the transmission image generator 905, it is generally required to simplify the hardware configuration suitable for an approximate operation mode, which increases the operational error.

The current international standard for color facsimile machines defines JPEG as a compression mode for transmission images. Therefore, it is convenient to accumulate draft images in JPEG format in a memory within a color facsimile machine as image data. Though, as the normal JPEG is of an irreversible compression type, it is impossible to restore to the draft image after encoding. The higher the compressibility of the JPEG image is increased, the more the image data can be accumulated in the memory within the color facsimile machine. In contrast, the image quality is remarkably deteriorated in the restored image.

In the image communication device 9 shown in FIG. 11, when the communicator 908 is employed for memory transmission and the destination is a monochromic facsimile machine, the transmission image generator 905 is required to convert the color image accumulated in the storage 907 into a binary image. Even when the color image is encoded into JPEG data at a level of permissible image quality deterioration on color image transmission, when it is converted into a binary image, an influence from the deteriorated image quality due to coding may appear in the restored binary image as a noise. Specifically, when the draft image is converted into JPEG image, characteristic noises named block noise and mosquito noise can appear at a higher compressibility on the edge of the restored image at obvious locations (specifically, on contours of characters, for example). Such the noises are remarkable particularly in the binarized image and dot-like noises appear around characters in the restored binary image (the image printed by the destination monochromatic facsimile machine).

A color draft image may be converted into a binary image at a certain resolution. It is also converted into a multi-valued image (color image) at the same resolution. In a comparison of both cases, an amount of information on visual identification when converted into the binary image is extremely less than that when converted into the color image. For example, even a sufficient resolution for facsimile transmission of a color image may lower the amount of information and reduce the visual identification when the brightness data is binarized at the same resolution.

SUMMARY OF THE INVENTION

It is an object of the present invention to provide a method and apparatus capable of transmitting color image data to a destination image communication device with performing only one color space conversion in any cases regardless of the color space processing capability of the destination image communication device.

It is another object of the present invention to provide a method and an apparatus which performs only one color space conversion in any cases to prevent the image quality from deteriorating due to color space conversion operational errors.

It is still another object of the present invention to provide a method and an apparatus capable of generating binary image data with less image quality deterioration when coded color image data accumulated in a memory is converted into binary image data before transmission.

It is still another object of the present invention to provide a method and an apparatus capable of generating binary image data with a large amount of information when coded color image data accumulated in a memory is converted into binary image data before transmission.

An image communication apparatus of the present invention holds a color draft image read by an image reading unit and accumulated in an image storage unit before image transmission to a destination and thereafter transmits image data corresponding with the image processing capability of the destination. The apparatus comprises a transmission image generation unit which converts a transmission image accumulated in the image storage unit into an image corresponding with the color space processing capability of the destination after connection to the destination, and a transmission unit which transmits the color-space converted image by the transmission image generation unit to the destination (hereinafter referred to as a "first aspect"). Alternatively, the apparatus comprises a transmission image generation unit which generates a binary image from a transmission image accumulated in the image storage unit before connection to the destination, and a transmission unit which transmits the binary image generated by the transmission image generation unit to the destination (hereinafter referred to as a "second aspect").

In the present invention, the image communication apparatus includes a facsimile machine, a communication card attachable to computers, and a facsimile/printer/copy composite machine. The communication line includes a telephone line, the Internet, LAN and WAN.

The image communication device of the present invention can be connected with other image communication devices through LAN in the following topology. For example, when the image communication device of the invention is a network scanner, other image communication devices may be computers that utilize the network scanner. When the image communication device of the invention is an Internet facsimile, other image communication devices may be computers or color facsimile machines connected to the Internet.

According to the first aspect of the invention, the transmission image generation unit may have a color space conversion function which is not effective on color space conversion of the transmission image stored in the image storage unit before connection to the destination and which is effective on color space conversion of the transmission image so as to correspond with the destination after connection to the destination when the color space of the transmission image does not correspond with the destination. In addition, the transmission image generation unit may have a function for converting the transmission image into a plurality of color spaces. Alternatively, it may have a color space selection function for selecting a color space corresponding with the color space processing capability of the destination from the plurality of color spaces. Further, the transmission image generation unit may have a function for converting a color draft image in RGB color space read by the image reading unit into image data in LAB space or sRGB color space.

The color space selector selects LAB space as the other space when the other image communication device is connected to a telephone line and selects sRGB space as the other space when the other image communication device is connected to the network.

In the conventional image communication device 9 as explained in FIG. 11, when the coded image data in sRGB space is to be sent, the color space conversions are required twice in total, (1) a conversion from RGB color space (a color space that contains a color image read by the image reading unit) to LAB color space, and (2) a conversion from LAB color space to decoded image sRGB color space. When the coded image data in LAB space is to be sent, the color space conversion by the color space conversion function of the transmission image generator 905 is performed only once, a conversion from RGB color space (a color space that contains a color image read by the image reading unit) to LAB color space.

In contrast, the image communication apparatus of the present invention requires only one conversion from RGB color space to sRGB color space or LAB color space both when the coded image data in sRGB space is to be sent and when the coded image data in LAB space is to be sent. Therefore, the present invention is possible to reduce the image quality deterioration due to color space conversion operational errors when the coded image data in sRGB space is sent.

The image communication apparatus of the invention is suitable for application to an image communication device having a memory transmission function. In this case, the color space selector selects the other space after the communicator establishes a connection to the other image communication device. In response to the selected result, the color space converter converts the decoded image data into image data in the other color space. As a result, even when transmission image is accumulated in the storage section before establishment of connection to the destination image communication device, it is possible to send image data corresponding with the color space processing capability of the destination image communication device.

According to the second aspect of the invention, the transmission image generation unit may be operative to perform color space conversion of the color draft image stored in the image storage unit when the color draft image is read by the image reading unit. The transmission image generation unit may have a binary coding function for generating binary image data by coding a brightness component in the color image at a certain compressibility before connection to the destination. In this case, the transmission image generation unit may be not operative to perform color space conversion of the color draft image of the read image when read by the image reading unit. The transmission image generation unit may have a binary coding function for generating binary image data from the brightness component of the color image. In addition, the apparatus may further comprise an image storage unit (of a general-purpose type, for example) which stores the brightness and color components of the color image. In this case, the transmission image generation unit may generate the binary image data from the brightness component stored in the image storage unit. The brightness component may have a lower compressibility than that of the color component. The transmission image generation unit may increase the compressibility of the brightness component stored in the image storage unit up to as high as the same compressibility of the color component stored in the image storage unit and synthesizes both components when the destination is provided with a color output capability. The transmission image generation unit may encode the color image data by applying irreversible compression to the color component and by applying reversible compression to the brightness component.

In the image communication apparatus of the invention, the brightness component may have a higher resolution than that of the color component. Further, the transmission image generation unit may decrease the resolution of the brightness component stored in the image storage unit down to as low as the same resolution of the color component stored in the image storage unit and synthesizes both components when the destination is provided with a color output capability.

The image communication apparatus of the invention may further comprise a unit which selects either a monochromic image or a colored image to be transmitted by the communication unit when the destination has an image processing capability of processing both monochromic and colored images. This allows the user to send a high-quality monochromic image even when a draft is colored while monochromic transmission is determined better.

These and other objects, features and advantages of the present invention are specifically set forth in or will become apparent from the following detailed descriptions of the invention when read in conjunction with the accompanying drawings.

DETAILED DESCRIPTIONS

Figure 1:
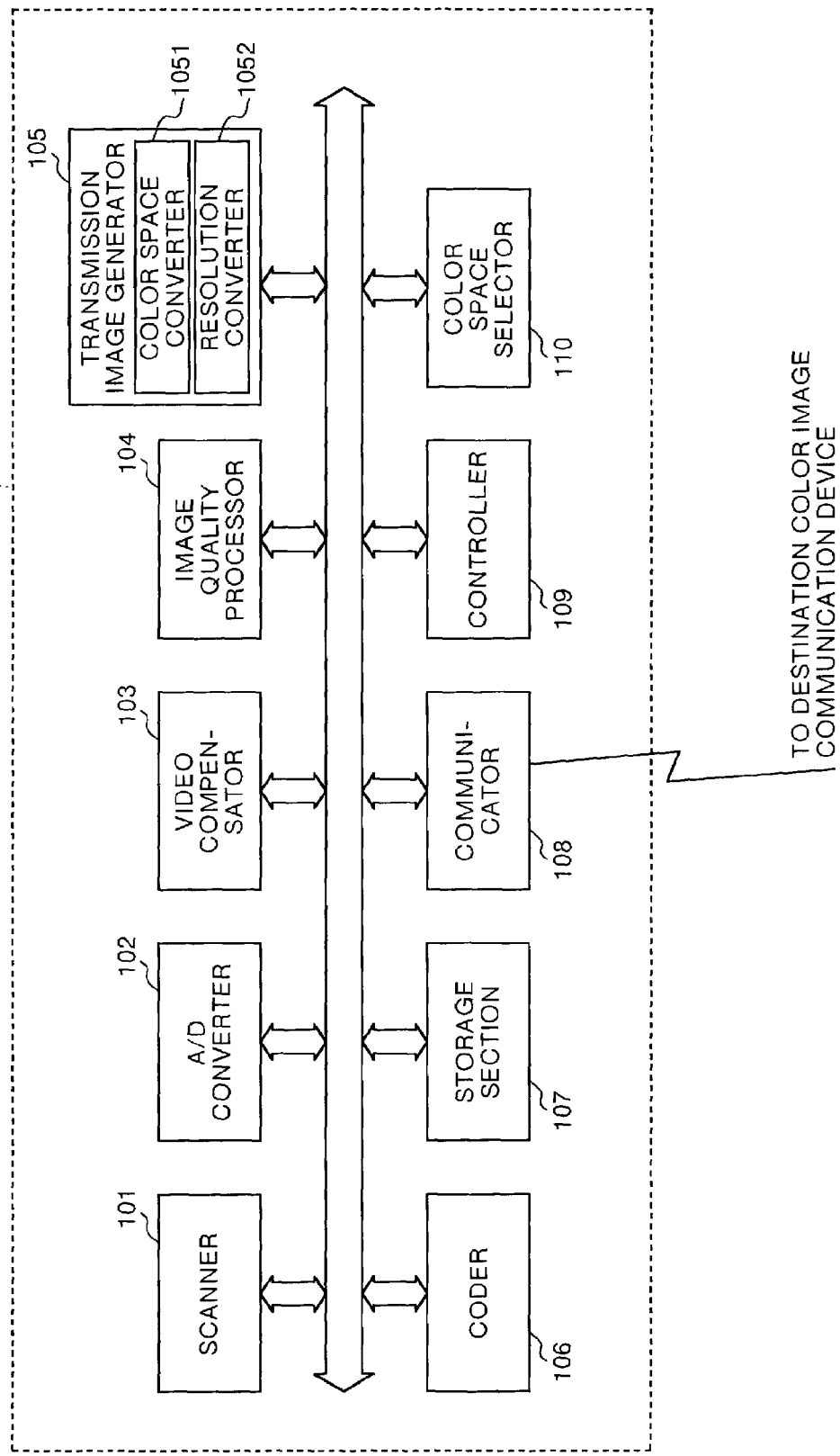
FIG. 1 is a block diagram of the image communication apparatus that shows a first embodiment of the present invention.

FIG. 1 is a block diagram of the image communication apparatus that shows a first embodiment of the present invention.

This image communication device is a facsimile machine 1. The facsimile machine 1 comprises a scanner (the image reading unit of the invention) 101, an A/D converter 102, a video compensator 103, an image quality processor 104, a transmission image generator (the transmission image generation unit of the invention) 105, a coder 106, a storage section 107, a communicator 108, a controller 109 and a color space selector 110. The transmission image generator 105 includes a color space converter 1051 and a resolution converter 1052.

In the first embodiment, the facsimile machine 1 is a color facsimile machine that has a network scanner function for compatibly connecting to a telephone line as well as to a LAN.

Figure 2:
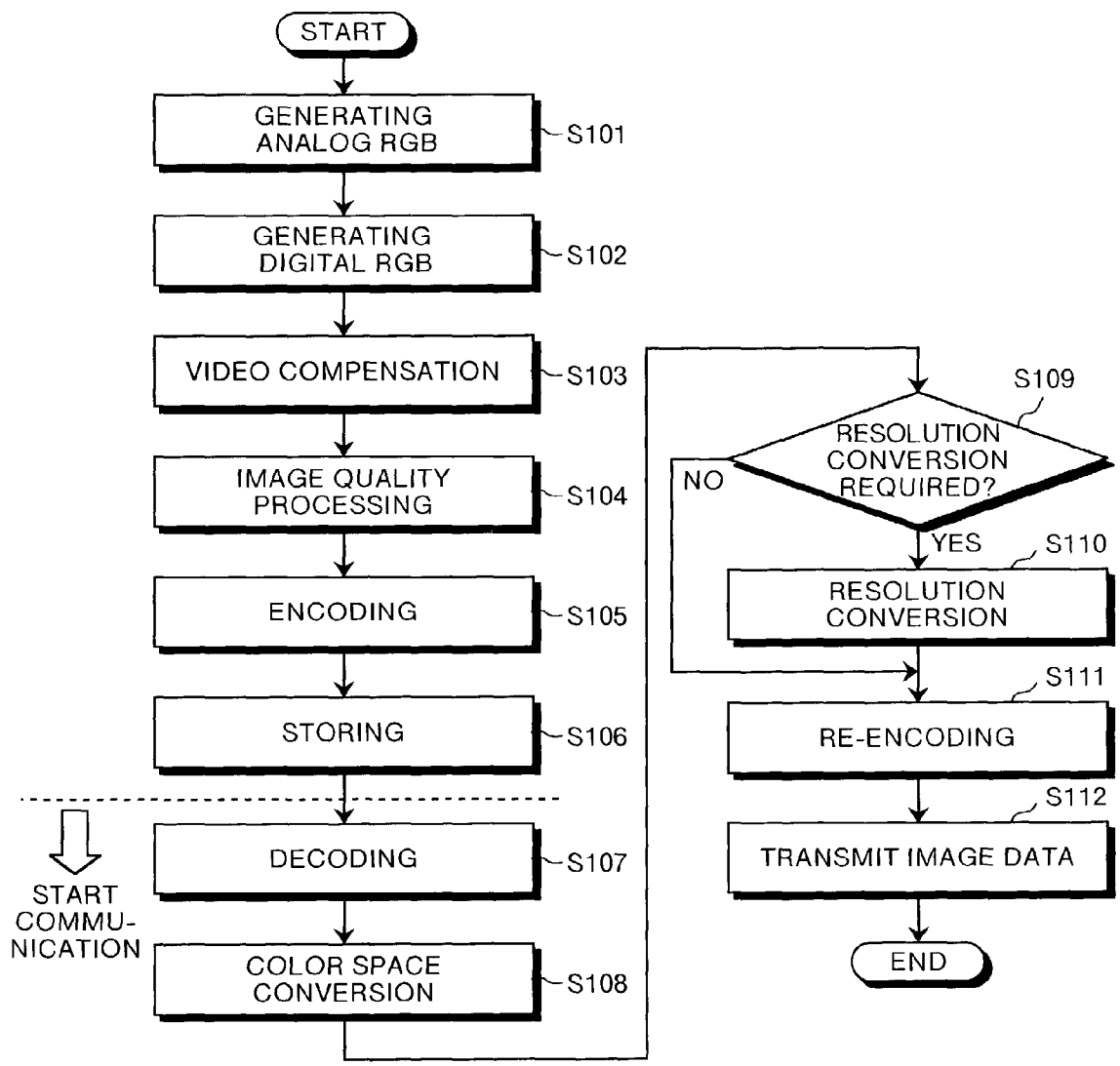
FIG. 2 is a flowchart of the operations performed by the image communication apparatus shown in FIG. 1.

The operations of the facsimile machine 1 will be explained below with reference to the flowchart shown in FIG. 2.

The scanner 101 reads a draft image and generates analog RGB signals (step S101). The A/D converter 102 converts the analog RGB signals into digital RGB signals (multi-valued data of R, G, B) (step S102). The video compensator 103 performs shading compensation to compensate white waveform distortion at the scanner 101 (step S103) and the image quality processor 104 performs edge emphasis by a filtering operation (step S104).

The coder 106 encodes the multi-valued data of R, G, B into JPEG image data (coded image data) (step S105) and stores it in the storage 107 such as a semiconductor memory and a hard disk (step S106).

On transmission of image data, the communicator 108 first establishes a connection to a destination image communication device. After establishment of the connection, the color space selector 110 acquires information on a transmission resolution and information on the destination image communication device. The latter indicates whether the destination image communication device is a device having a function for processing color image data in LAB color space or a device having a function for processing color image data in sRGB space, such as an Internet facsimile.

The color space selector 110 in the first embodiment is shown as an individual unit separated from the controller 109 (consisting of a ROM storing programs and data, a CPU and so forth), though the controller 109 may also function as the color space selector 110.

To transmit image data, the coder 106 first decodes JPEG image data stored in the storage 107 (step S107). The decoding of the JPEG image data yields decoded image data in RGB space.

When the destination image communication device is the device having the function for processing color image data in LAB color space, RGB image data is converted into image data in LAB color space. When the destination image communication device is the device having the function for processing color image data in sRGB space, RGB image data is converted into image data in sRGB color space (step S108).

The controller 109 determines whether a resolution conversion corresponding with the destination image communication device is required (step S109). When the resolution conversion is not required, the coder 106 re-encodes the image data created at the step S108 into JPEG image data (step S111). On the other hand, when the resolution conversion is required, the resolution converter 1052 converts a resolution of the image data created at the step S107 (step S110) and the coder 106 re-encodes the resolution-converted image data into JPEG image data (step S111).

The JPEG image data re-encoded at the step S111 is transmitted to the destination image communication device through the communicator 108 (step S112).

Figure 3:
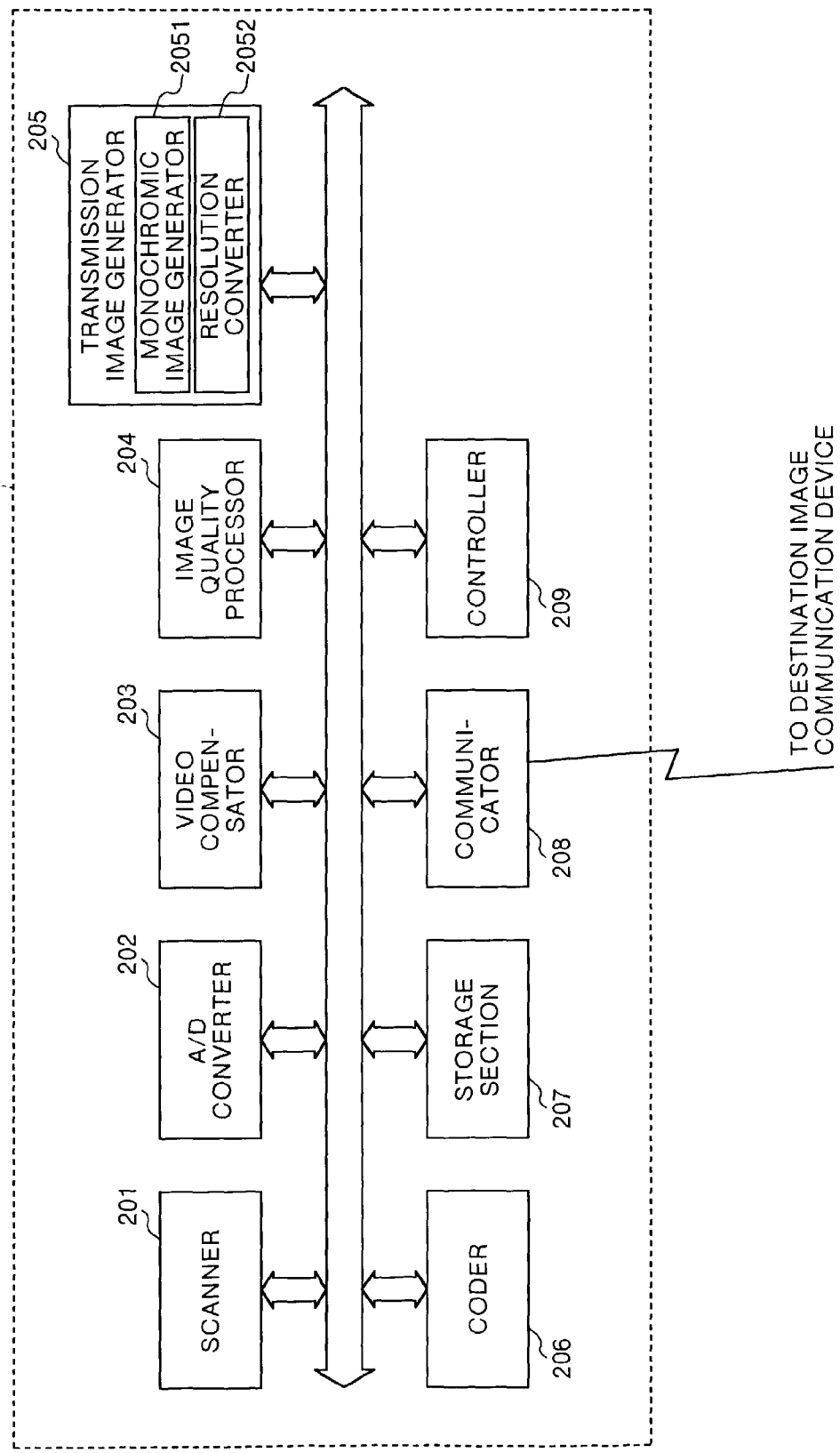
FIG. 3 is a block diagram of the image communication apparatus that shows a second embodiment of the present invention.

FIG. 3 is a block diagram of the image communication apparatus that shows a second embodiment of the present invention.

The image communication device is a facsimile machine 2. The facsimile machine 2 comprises a scanner 201, an A/D converter 202, a video compensator 203, an image quality processor 204, a transmission image generator 205, a coder 206, a storage section 207, a communicator 208, a controller 209 and a transmission image selector 210. The transmission image generator 205 includes a monochromic image generator 2051 and a resolution converter 2052. In this embodiment, the transmission image generator 205 generates both a color image and a monochromic image prior to transmission and the facsimile machine 2 fundamentally transmits the color image automatically when the destination image communication device is a color facsimile machine. The transmission image selector 210 may be employed to transmit the monochromic image even when the destination image communication device is the color facsimile machine.

Figure 4:
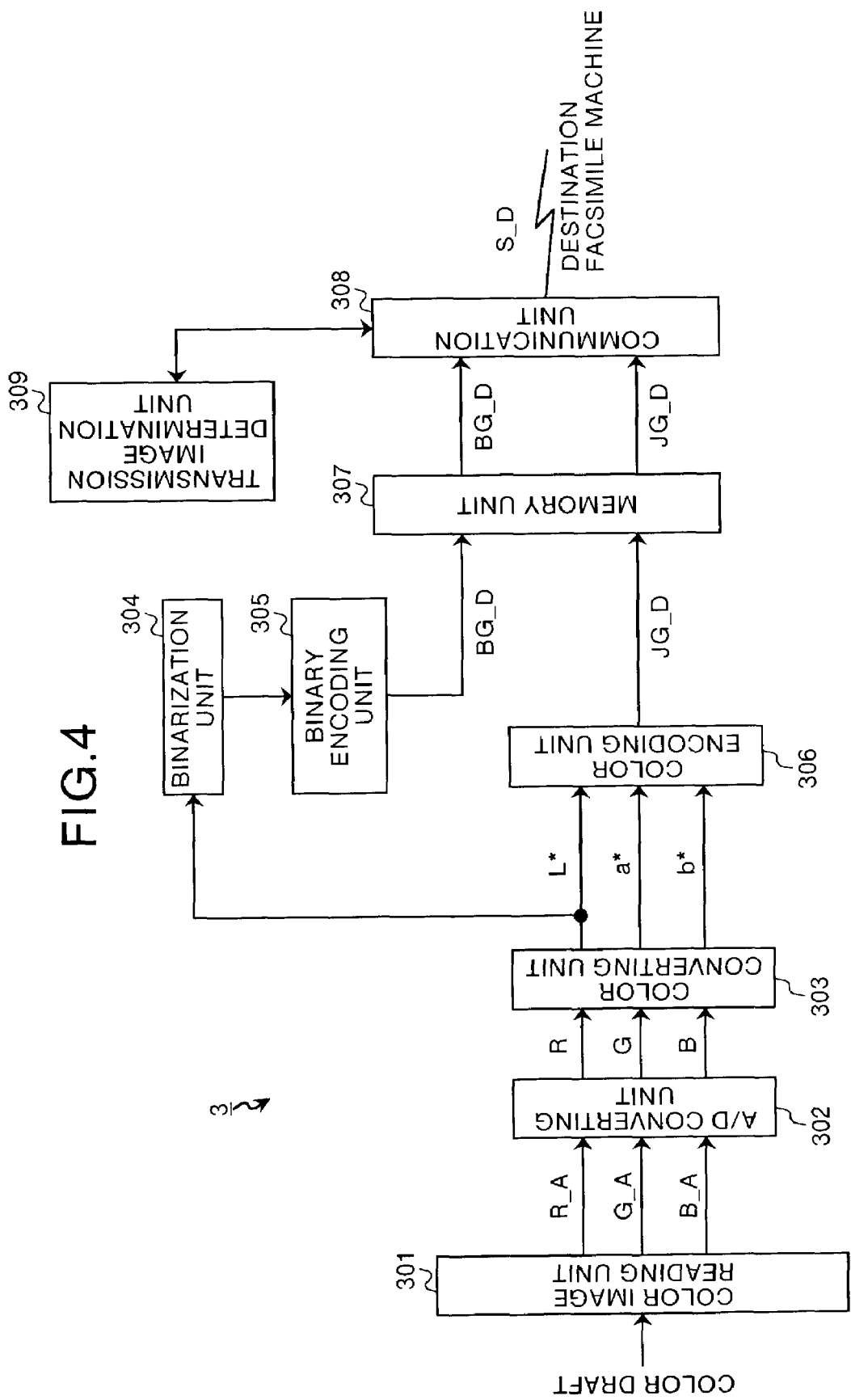
FIG. 4 is a block diagram that shows a color space conversion function of the image communication apparatus shown in FIG. 3 as a third embodiment of the present invention.

FIG. 4 is a block diagram that shows a color space conversion function of the image communication apparatus shown in FIG. 3 as a third embodiment of a facsimile machine 3 of the present invention.

FIG. 4 shows that the facsimile machine 3 comprises a color image reading unit 301, an A/D converting unit 302, a color space converting unit 303, a binarization unit 304, a binary encoding unit 305, a color encoding unit 306, a memory unit 307, a communication unit 308 and a transmission image determination unit 309.

The color image reading unit 301 includes light-emitting devices such as LEDs and LDs, and sensors such as CCDs. It reads an image on a draft to output analog RGB signals (R_A, G_A, B_A). The analog RGB signals (R_A, G_A, B_A) are converted by the A/D converting unit 302 into digital RGB signals (digital data R, G, B).

The digital RGB signals are fed into the color space converting unit 303 and converted from RGB color space into a generally device-independent color space, CIE L*a*b* color space in this embodiment. L* is a brightness component, a* and b* are color components. As for commonly applied image processing (for example, processing of image quality improvement such as filtering), it is not related to the essence of the invention and accordingly omitted to describe in this embodiment.

The image data L*, a*, b*, color-space converted by the color space converting unit 303, is encoded (compressed) into coded color image data (JPEG image data JG_D) by the color encoding unit 306 and accumulated in the memory unit 307.

Along with the JPEG compression of the image data L*, a*, b*, the brightness component L* is binarized at the binarization unit 304 and the binarized data is encoded (for example, MH, MR, MMR, JBIG) at the binary encoding unit 305 to generate coded binary image data BG_D.

The coded binary image data BG_D is accumulated in the memory unit 307 together with the JPEG image data JG_D.

The international standard for color facsimiles, ITU-TT.42, defines CIE L*a*b* as a color space and JPEG baseline as a coding mode. The color encoding unit 306 is based on the JPEG baseline.

In the third embodiment, after the facsimile machine 3 establishes a connection to the destination facsimile machine (after calling), the transmission image determination unit 309 determines whether to transmit coded color image data for transmission or coded binary image data for transmission, as transmission image data. This determination depends on whether the destination facsimile machine has a function for receiving color images. The transmission image determination unit 309 is shown as a block element in FIG. 4, though it can be achieved by a CPU in the facsimile machine 3 or an appropriate processor, not depicted, and a program stored in the ROM and the like in combination. Alternatively, the communication unit 308 may contain the function of the transmission image determination unit 309.

When the destination facsimile machine is a monochromatic facsimile machine, the transmission image determination unit 309 determines the coded binary image data for transmission as the transmission image data. In this case, the communication unit 308 transmits the coded binary image data for transmission BG_D accumulated in the memory unit 307 to the destination facsimile machine as the transmission image data S_D.

On the other hand, when the destination facsimile machine is a color facsimile machine, the transmission image determination unit 309 determines the coded color image data for transmission as the transmission image data. In this case, the communication unit 308 transmits the coded color image data for transmission JG_D accumulated in the memory unit 307 to the destination facsimile machine as the transmission image data S_D.

Conventionally, only the coded color image data is accumulated in the memory unit. Therefore, when the destination facsimile machine is a monochromic facsimile machine, from the brightness component in the coded color image data, binary image data is generated and encoded, and the coded data is transmitted. As described above, however, as long as the international standard ITU standard JPEG is employed as the compression mode, the image quality on a binary image to be regenerated by the destination facsimile machine is inevitably deteriorated. In other words, dot-like noises named the mosquito noise appear around characters at edges of characters. Such the noises possibly appear at characters as well as all edge-like parts.

In contrary, in the third embodiment, besides the JPEG compression, the coded binary image data BG_D is created. Therefore, it does not suffer influence from the image quality deterioration due to the irreversible compression and can eliminate the image quality deterioration on binary image transmission even when the memory transmission is performed. That is, on the memory transmission, even when the destination facsimile machine has nothing but a communication function for binary images, it does not suffer influence from the image quality deterioration due to the irreversible compression and it is possible to transmit image data with less noise.

Figure 5:
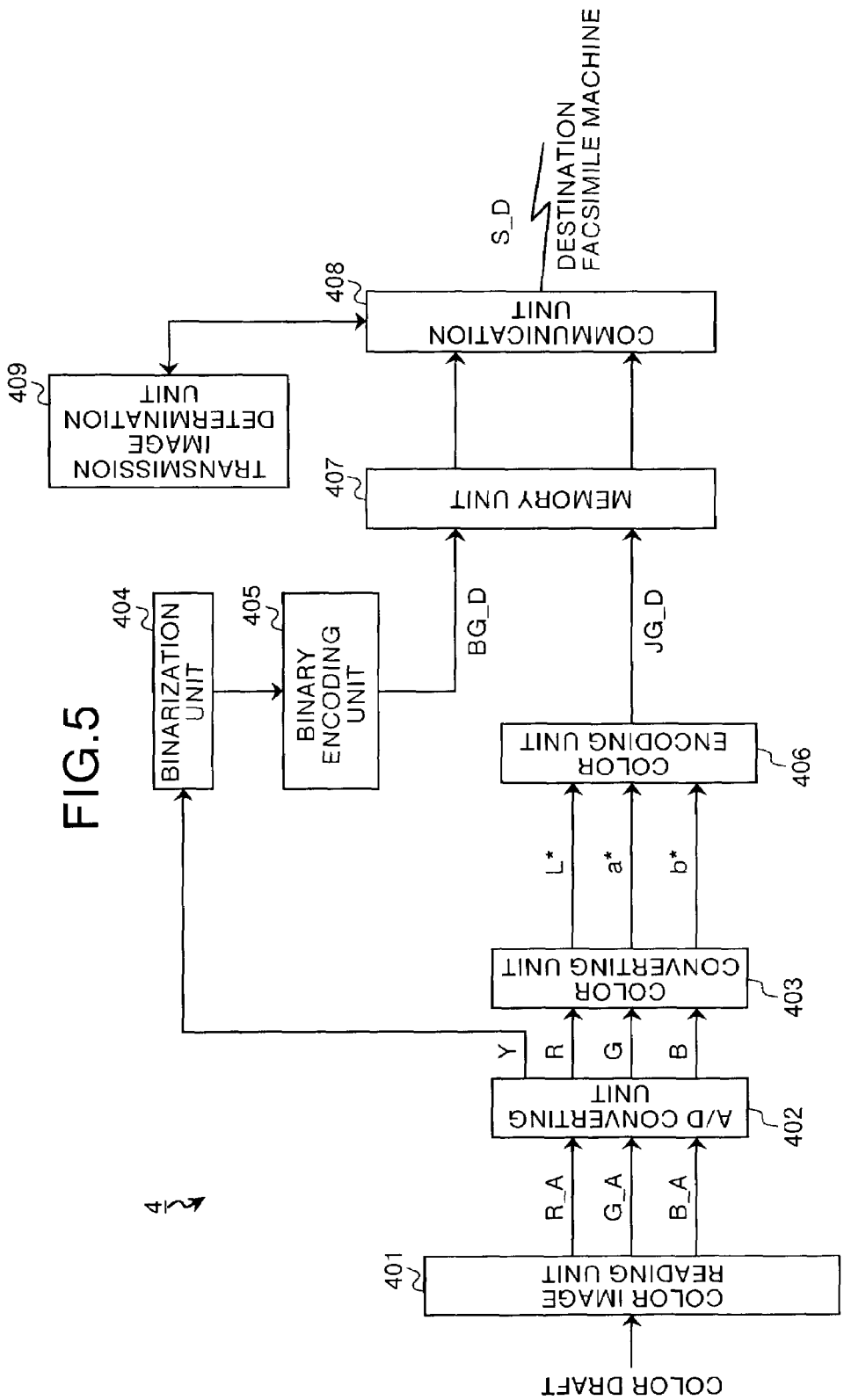
FIG. 5 is a block diagram that shows a color space conversion function of the image communication apparatus shown in FIG. 3 as a fourth embodiment of the present invention.

FIG. 5 is a block diagram that shows a color space conversion function of the image communication apparatus shown in FIG. 3 as a fourth embodiment of a facsimile machine 4 of the present invention.

The facsimile machine 4 comprises a color image reading unit 401, an A/D converting unit 402, a color space converting unit 403, a binarization unit 404, a binary encoding unit 405, a color encoding unit 406, a memory unit 407, a communication unit 408 and a transmission image determination unit 409.

In this embodiment, the color image reading unit 401 is employed to read an image on a draft to output analog RGB signals (R_A, G_A, B_A) to the A/D converting unit 402. The analog RGB signals (R_A, G_A, B_A) are converted by the A/D converting unit 402 into digital RGB signals (digital data R, G, B). The digital RGB signals are color-space converted into image data L*, a*, b* at the color space converting unit 403, encoded into coded color image data (JPEG image data JG_D) at the color encoding unit 406 and accumulated in the memory unit 407. At the same time, coded binary image data BG_D is generated from the digital RGB signals by the binarization unit 404 and accumulated in the memory unit 407.

In the fourth embodiment, after the facsimile machine 4 establishes a connection to the destination facsimile machine (after calling), the transmission image determination unit 409 determines either the coded color image data JG_D or the coded binary image data BG_D as transmission image data S_D. This determination depends on whether the destination facsimile machine has a function for receiving color images. The communication unit 408 transmits the coded JPEG image data JG_D or the coded binary image data BG_D to the destination facsimile machine as the transmission image data S_D.

In the third embodiment shown in FIG. 4, the coded binary image data BG_D is generated from the brightness data L* of the data that is once color-space converted from RGB color space to L*a*b* color space. In contrary, in the fourth embodiment, the coded binary image data BG_D is generated from the brightness component (denoted by Y in FIG. 5) of the digital RGB signals.

Also in the fourth embodiment, on memory transmission, when the destination facsimile machine is a monochromic facsimile machine, it does not suffer influence from the image quality deterioration due to the irreversible coding by the color encoding unit 406. Accordingly, it is possible to transmit image data with less noise.

Figure 6:
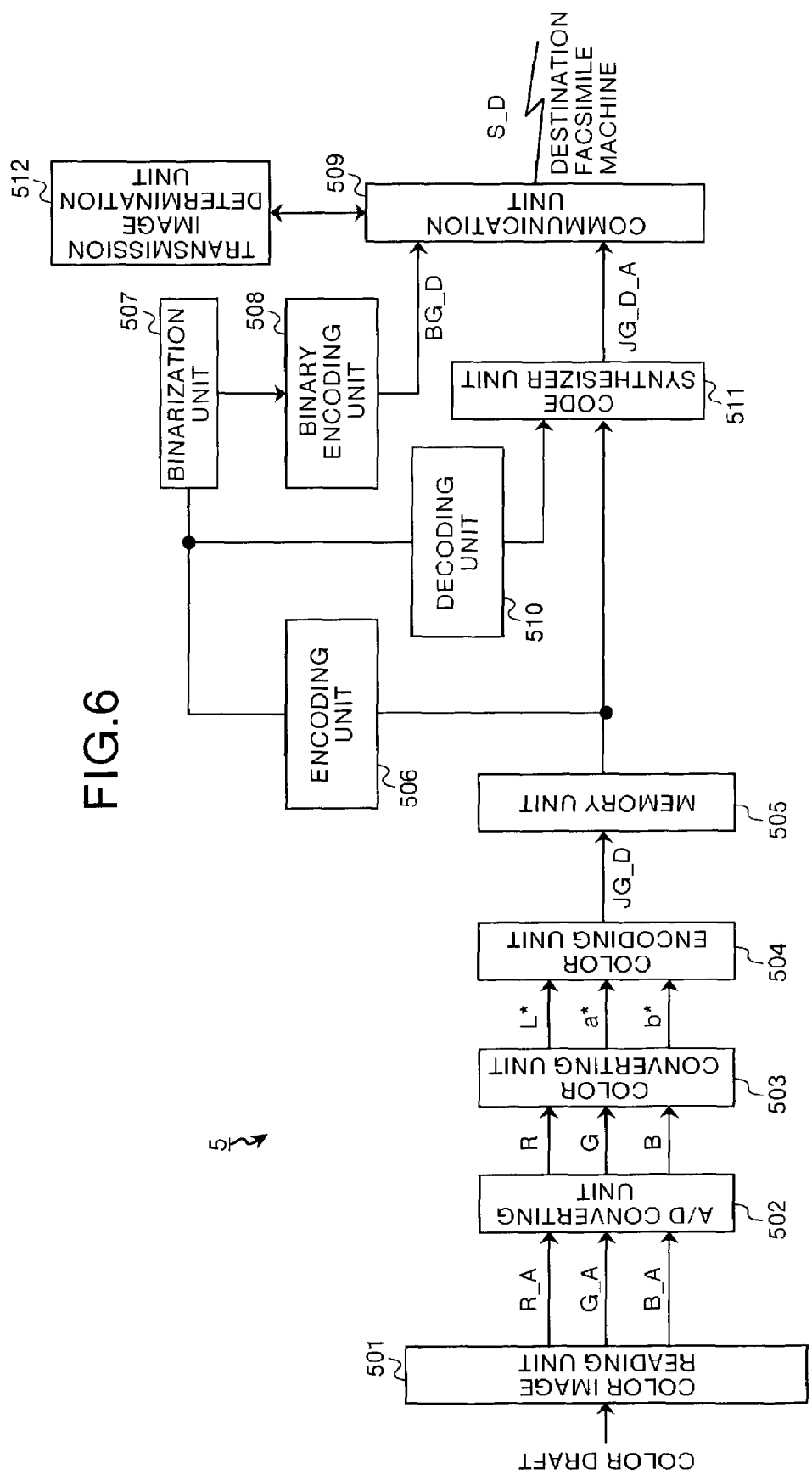
FIG. 6 is a block diagram that shows a color space conversion function of the image communication apparatus shown in FIG. 3 as a fifth embodiment of the present invention.

FIG. 6 is a block diagram that shows a color space conversion function of the image communication apparatus shown in FIG. 3 as a fifth embodiment of a facsimile machine 5 of the present invention.

The facsimile machine 5 comprises a color image reading unit 501, an A/D converting unit 502, a color space converting unit 503, a color encoding unit 504, a memory unit 505, a decoding unit 506, a binarization unit 507, a binary encoding unit 508, a communication unit 509, an encoding unit 510, a code synthesizer unit 511 and a transmission image determination unit 512.

The image data read by the color image reading unit 501 is converted from analog RGB signals (R_A, G_A, B_A) into digital RGB signals (digital data R, G, B) by the A/D converting unit 502. The color-space converted digital image data is converted from RGB color space into CIE L*a*b* color space by the color space converting unit 503. The color-space converted image data L*, a*, b* is encoded into coded color image data (JPEG image data JG_D_A) by the color encoding unit 504 and accumulated in the memory unit 505. As for the brightness data L*, a compressibility is set to achieve a sufficient image quality for normal color communications, or compared to a compressibility that is normally set for color image communications, a lower compressibility is set (setting of less compression) to reduce image quality deterioration due to coding as far as possible. Specifically, the brightness data L* can be encoded at the standard compressibility for monochromic facsimile transmissions.

In the fifth embodiment, after the facsimile machine 5 establishes a connection to the destination facsimile machine (after calling), the transmission image determination unit 512 determines whether to transmit coded color image data for transmission or coded binary image data for transmission as transmission image data. This determination depends on whether the destination facsimile machine has a function for receiving color images.

When the destination facsimile machine is a monochromatic facsimile machine, the transmission image determination unit 512 determines the coded binary image data for transmission as the transmission image data, followed by the following process.

The brightness component of the coded color image data (JPEG image data JG_D_A) accumulated in the memory unit 505 is decoded by the decoding unit 506, then binarized at the binarization unit 507 to generate binarized image data. The binarized image data is binary encoded by the binary encoding unit 508 to generate coded binary image data for transmission BG_D. The communication unit 509 transmits the coded binary image data for transmission BG_D to the destination facsimile machine as the transmission image data S_D.

On the other hand, when the destination facsimile machine is a color facsimile machine, the transmission image determination unit 512 determines the coded color image data for transmission as the transmission image data, followed by the following process.

The brightness component of the coded color image data (JPEG image data JG_D_A) accumulated in the memory unit 505 is decoded by the decoding unit 506, then encoded by the encoding unit 510 at the standard compressibility for color facsimile transmissions (normal compressibility). The coded brightness data and the coded color component data in the memory unit 505 are synthesized into one code by the code synthesizer unit 511 to generate the coded color image data for transmission (JPEG image data JG_D). The communication unit 509 transmits the coded color image data for transmission JG_D to the destination facsimile machine as the transmission image data S_D.

The configuration of the image communication device in the fifth embodiment, as for the brightness component of the coded color image data (JPEG image data JG_D_A) accumulated in the memory unit 505, can suppress the image quality deterioration as far as possible. Therefore, transmission of the binarized image data suffers less influence from the image quality deterioration.

FIG. 6 shows that the encoding unit 510 is prepared besides the encoding unit 504, though the encoding unit 504 may be employed to encode the brightness data L* once decoded.

Figure 7:
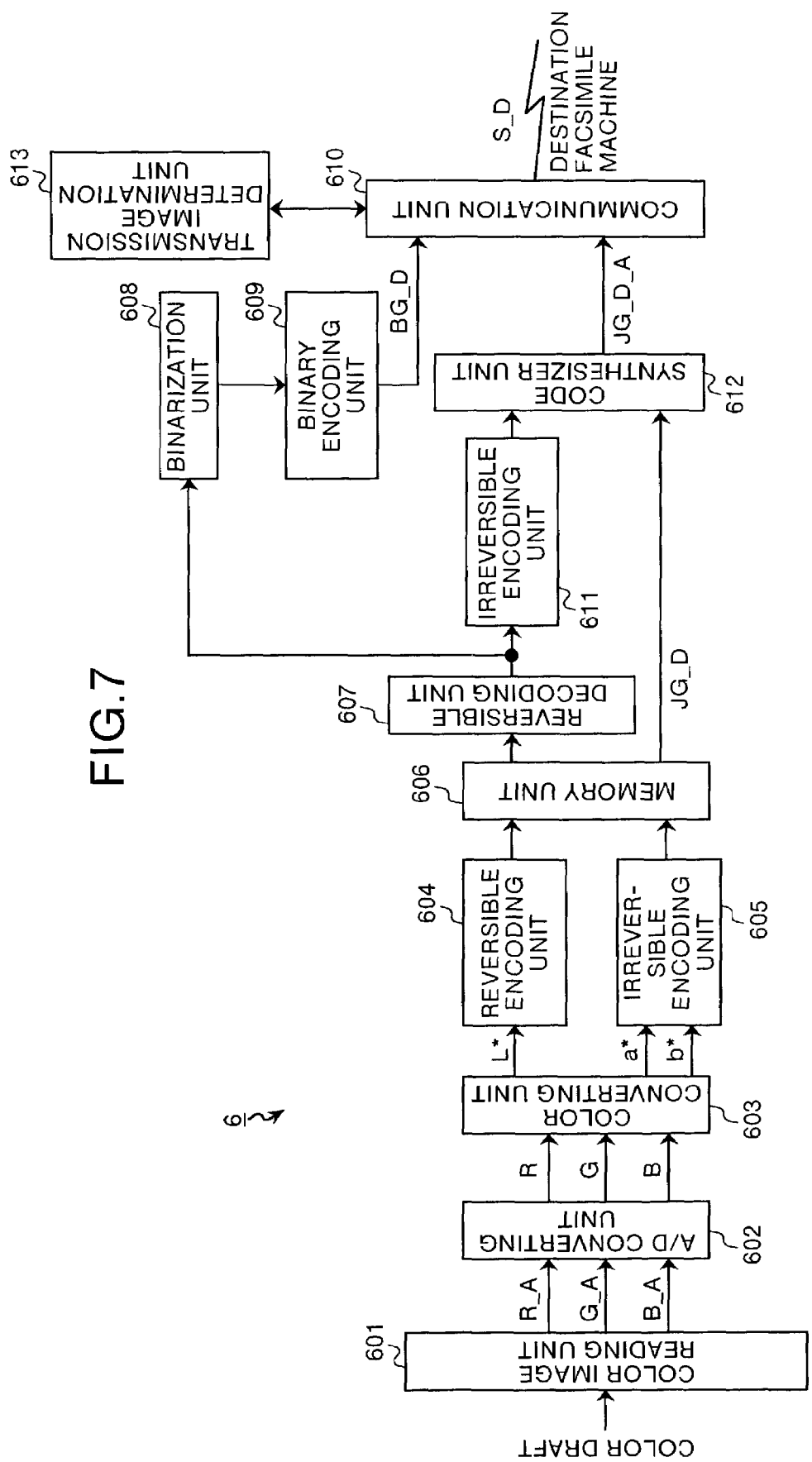
FIG. 7 is a block diagram that shows a color space conversion function of the image communication apparatus shown in FIG. 3 as a sixth embodiment of the present invention.

FIG. 7 is a block diagram that shows a color space conversion function of the image communication apparatus shown in FIG. 3 as a sixth embodiment of a facsimile machine 6 of the present invention.

This facsimile machine 6 comprises a color image reading unit 601, an A/D converting unit 602, a color space converting unit 603, a reversible encoding unit 604, an irreversible encoding unit 605, a memory unit 606, a reversible decoding unit 607, a binarization unit 608, a binary encoding unit 609, a communication unit 610, an irreversible encoding unit 611, a code synthesizer unit 612 and a transmission image determination unit 613.

The image data read by the color image reading unit 601 is converted from analog RGB signals (R_A, G_A, B_A) into digital RGB signals (digital data R, G, B) by the A/D converting unit 602. The color-space converted digital image data is converted from RGB color space into CIE L*a*b* color space by the color space converting unit 603. The color-space converted brightness data L* is encoded by the reversible encoding unit 604 and accumulated in the memory unit 606. The reversible encoding can be performed using JPEG Spatial mode. The converted color data a*, b* is encoded by the irreversible encoding unit 605 and accumulated in the memory unit 606. The compression-coded color image data (JPEG image data) accumulated in the memory unit 606 is indicated by JG_D_B in FIG. 7.

After the facsimile machine 6 establishes a connection to the destination facsimile machine (after calling), the transmission image determination unit 613 determines whether to transmit coded color image data for transmission or coded binary image data for transmission as transmission image data. This determination depends on whether the destination facsimile machine has a function for receiving color images.

When the destination facsimile machine is a monochromatic facsimile machine, the transmission image determination unit 613 determines the coded binary image data for transmission as the transmission image data, followed by the following process.

The brightness component of the coded color image data (JPEG image data JG_D_B) accumulated in the memory unit 606 is decoded by the reversible decoding unit 607, then binarized at the binarization unit 608 to generate binarized image data. The binarized image data is binary encoded by the binary encoding unit 609 to generate coded binary image data for transmission BG_D. The communication unit 610 transmits the coded binary image data for transmission BG_D to the destination facsimile machine as the transmission image data S_D.

On the other hand, when the destination facsimile machine is a color facsimile machine, the transmission image determination unit 613 determines the coded color image data for transmission as the transmission image data, followed by the following process.

The brightness component of the coded color image data (JPEG image data JG_D_B) accumulated in the memory unit 606 is decoded by the reversible decoding unit 607, then encoded by the irreversible encoding unit 611 at the standard compressibility for color facsimile transmissions (normal compressibility). The coded brightness data and the coded color component data in the memory unit 606 are synthesized into one code by the code synthesizer unit 612 to generate the coded color image data for transmission (JPEG image data JG_D). The communication unit 610 transmits the coded color image data for transmission JG_D to the destination facsimile machine as the transmission image data S_D.

The configuration of the image communication device in the sixth embodiment, as for the brightness component of the coded color image data (JPEG image data JG_D_A), hardly causes image quality deterioration when the brightness data is accumulated in the memory unit 606. As a result, the binarized image data for transmission has an improved image quality accordingly.

The irreversible encoding unit 611 is prepared besides the irreversible encoding unit 605, though the irreversible encoding unit 605 may be employed to encode the brightness data L* once decoded.

Figure 8:
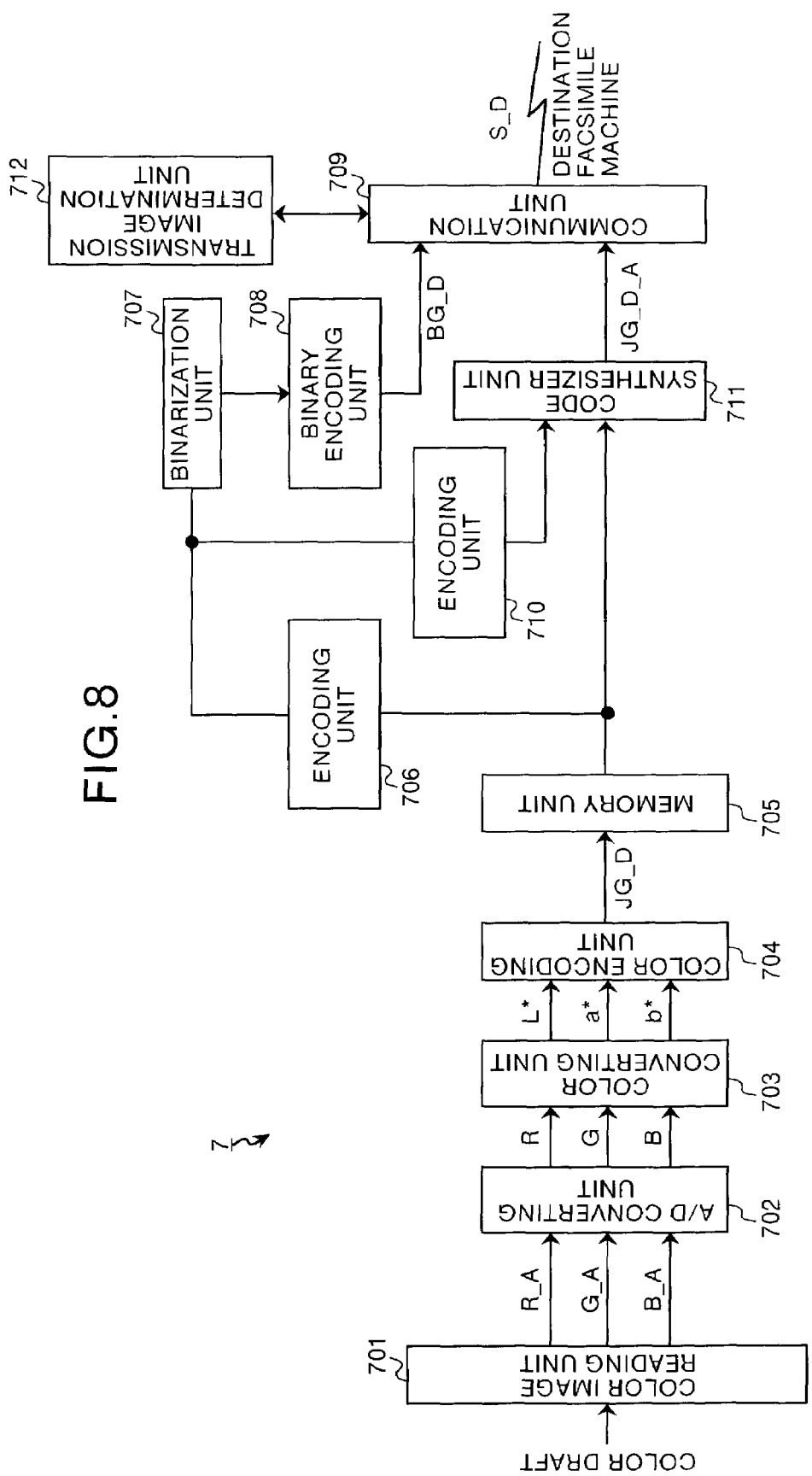
FIG. 8 is a block diagram that shows a color space conversion function of the image communication apparatus shown in FIG. 3 as a seventh embodiment of the present invention.

FIG. 8 is a block diagram that shows a color space conversion function of the image communication apparatus shown in FIG. 3 as a seventh embodiment of a facsimile machine 7 of the present invention.

The facsimile machine 7 comprises a color image reading unit 701, an A/D converting unit 702, a color space converting unit 703, a color encoding unit 704, a memory unit 705, a decoding unit 706, a binarization unit 707, a binary encoding unit 708, a communication unit 709, an encoding unit 710, a code synthesizer unit 711 and a transmission image determination unit 712.

The image data read by the color image reading unit 701 is converted from analog RGB signals (R_A, G_A, B_A) into digital RGB signals (digital data R, G, B) by the A/D converting unit 702. The converted digital image data is converted from RGB color space into CIE L*a*b* color space by the color space converting unit 703. The converted image data L*, a*, b* is encoded into coded color image data (JPEG image data JG_D_C) by the color encoding unit 704 and accumulated in the memory unit 705. As for the brightness data L*, a resolution is set to achieve a sufficient image quality for normal color communications, or compared to a resolution that is normally set for color image communications, a higher resolution is set.

In a common color facsimile machine, an amount of information on color image data for transmission is larger than that on binary image data for transmission. This can be also identified visually. In a comparison of a binary image and a multi-valued image, the multi-valued image can transmit much more sufficient information at a lower resolution. In other words, binarization of a certain color image requires a higher resolution compared to transmission of the color image.

The facsimile machine 7 accumulates the brightness data L* at a higher resolution than that for use in normal color communications (the standard resolution for color facsimile communications). It is possible to improve the quality of the binarized image and increase the amount of information by applying the standard resolution for monochromic facsimile communications (the normal resolution) to the brightness data L*.

In JPEG, as human visual sensitivity is low with respect to the resolution for the color component, data is generally thinned out. On the other hand, as human visual sensitivity is high with respect to the resolution for the brightness component, data is not thinned out. For example, the color image reading unit 701 has a resolution of 600 dpi, even though, in consideration of communication time and image quality, approximately 200 dpi is often employed for the normal color transmission. In such the case, the brightness component is encoded at 200 dpi and the color component is encoded at 100 dpi (the direction of main scanning), for example. In this case, however, as the brightness component accumulated in the memory unit 705 has 200 dpi, binarized image derived from the brightness component also has 200 dpi.

When the image that is read by the color image reading unit 701 has a resolution of 600 dpi, for example, the brightness component is accumulated at the resolution of 600 dpi. In contrast, the color component is thinned out (for example, at 300 dpi) and accumulated in the memory unit 705.

After the facsimile machine 7 establishes a connection to the destination facsimile machine (after calling), the transmission image determination unit 712 determines whether to transmit coded color image data for transmission or coded binary image data for transmission as transmission image data. This determination depends on whether the destination facsimile machine has a function for receiving color images.

When the destination facsimile machine is a monochromatic facsimile machine, the transmission image determination unit 712 determines the coded binary image data for transmission as the transmission image data, followed by the following process.

The brightness component of the coded color image data (JPEG image data JG_D_C) accumulated in the memory unit 705 is decoded by the decoding unit 706, then binarized at the binarization unit 707 to generate binarized image data. When the color image data decoded by the decoding unit 706 has a resolution of 600 dpi, the resolution remains 600 dpi after the data is binarized at the binarization unit 707. The binarized data is binary encoded by the binary encoding unit 708 to generate coded binary image data for transmission BG_D. The communication unit 709 transmits the coded binary image data for transmission BG_D to the destination facsimile machine as the transmission image data S_D.

On the other hand, when the destination facsimile machine is a color facsimile machine, the transmission image determination unit 712 determines the coded color image data for transmission as the transmission image data, followed by the following process.

The brightness component of the 300-dpi coded color image data (JPEG image data JG_D_C) accumulated in the memory unit 705 is decoded by the decoding unit 706, then encoded by the encoding unit 710 at the standard compressibility for color facsimile transmissions (normal compressibility), 200 dpi in this embodiment.

The coded brightness data and the coded color component data in the memory unit 705 are synthesized into one code by the code synthesizer unit 711 to generate the coded color image data for transmission (JPEG image data JG_D). The coded color image data (JPEG image data JG_D_C) is accumulated at 300 dpi in the memory unit 705 and the code synthesizer unit 711 coverts the coded color image data into 200 dpi on synthesis. The communication unit 709 transmits the coded color image data for transmission JG_D to the destination facsimile machine as the transmission image data S_D.

The binary image in the seventh embodiment can be transmitted to the destination facsimile machine still at the resolution of 600 dpi.

Figure 9:
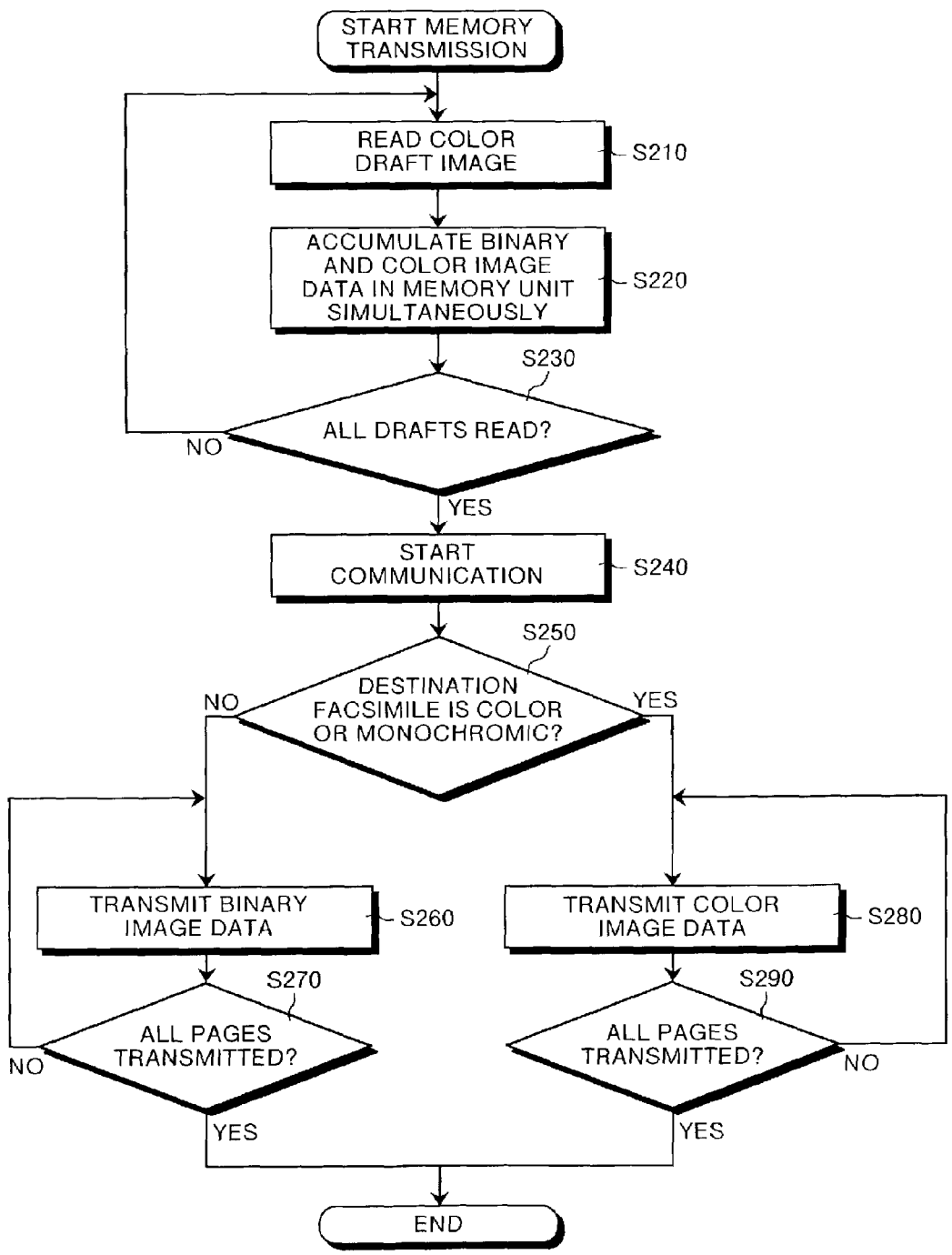
FIG. 9 is a flowchart of the memory transmission process performed in the third and fourth embodiments.

Operations on memory transmission by the facsimile machine 3 shown in FIG. 4 and the facsimile machine 4 shown in FIG. 5 will be explained with reference to FIG. 9. First, reading of a color draft image is performed (step S110). This reading allows binary image data and color image data to be accumulated simultaneously in a memory unit (step S220). When the draft is one of a plurality of drafts, all drafts are read (step S230) and a communication is started (step S240). After a connection to the destination facsimile machine, determination is made on whether the destination facsimile machine is a color facsimile machine or a monochromic facsimile machine (step S250).

When the destination facsimile machine is a monochromatic facsimile machine, binary image data is transmitted (step S260), and when it is a color facsimile machine, color image data is transmitted (step S280). This transmission is repeated to cover all accumulated images (step S270, S290).

Figure 10:
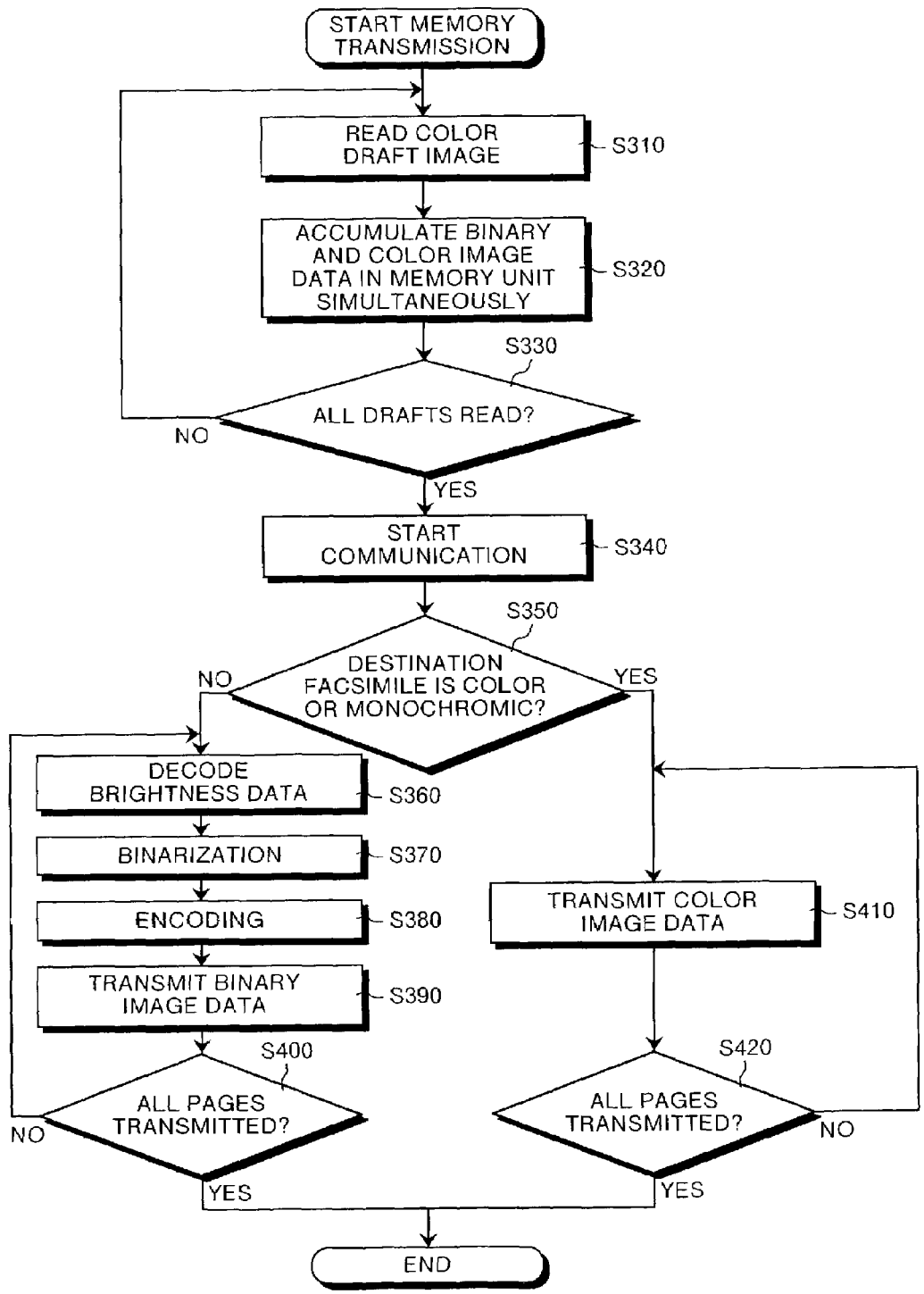
FIG. 10 is a flowchart of the memory transmission process performed in the fifth to seventh embodiments.
Figure 11:
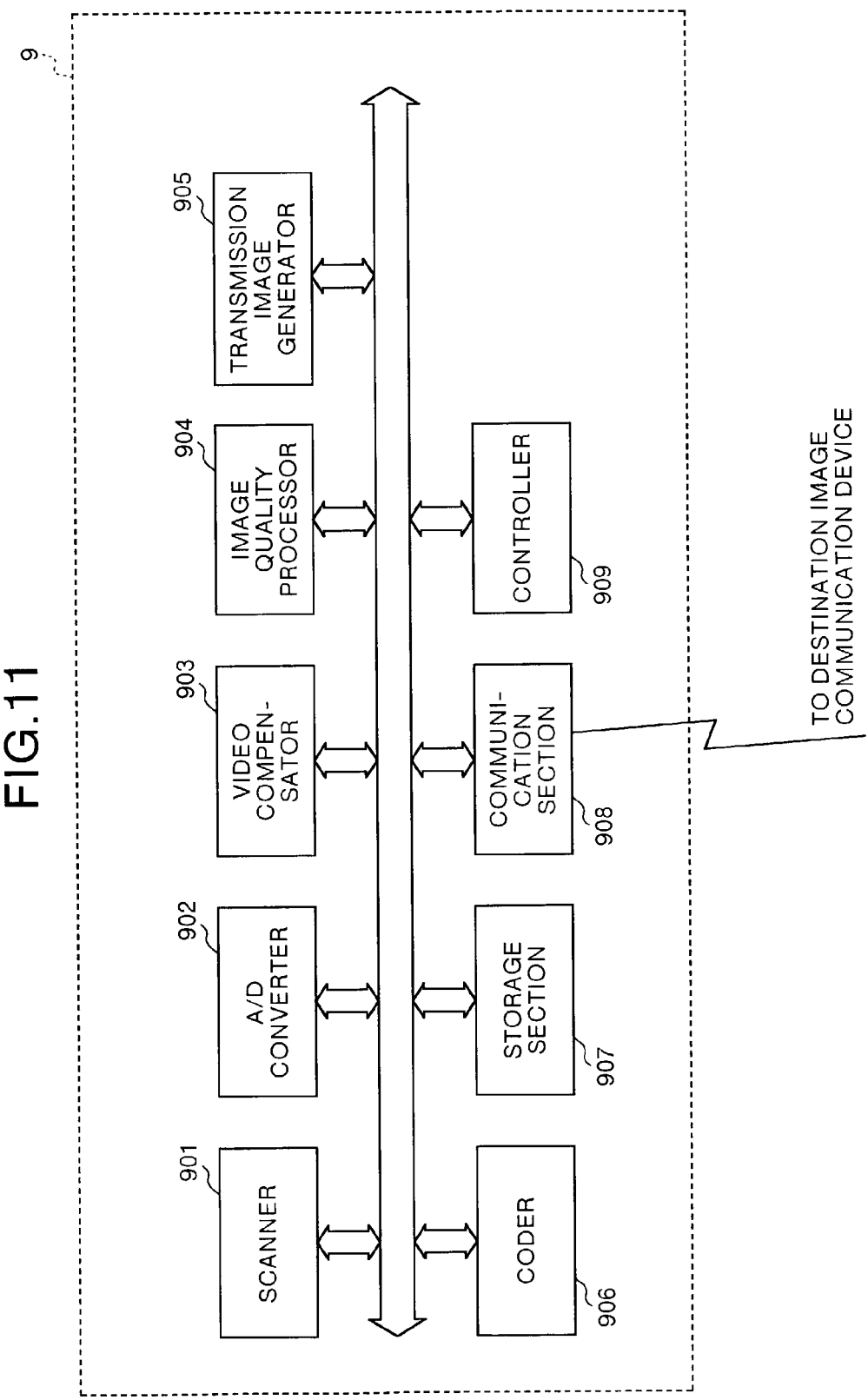
FIG. 11 is a block diagram of the conventional image communication device.
Figure 12:
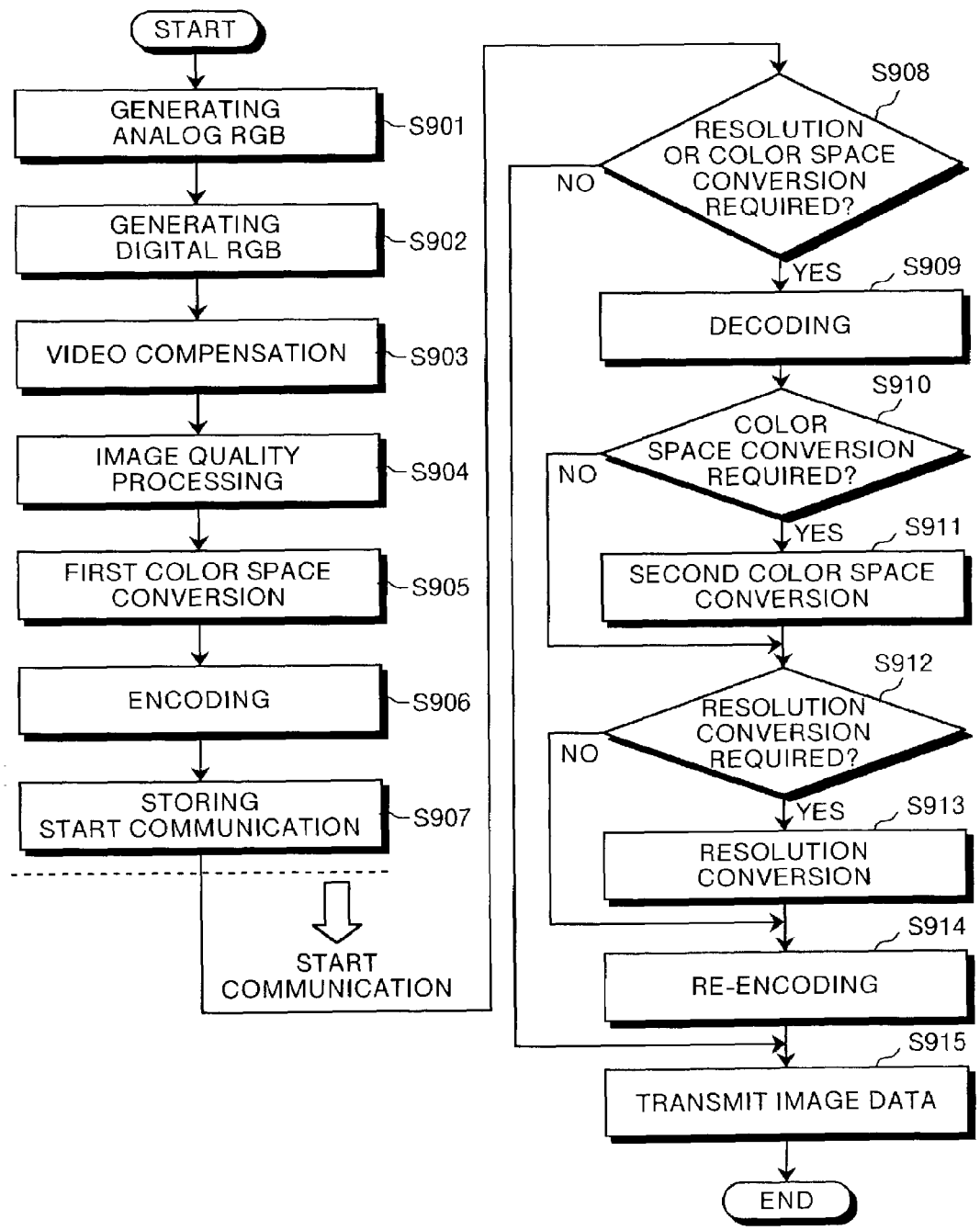
FIG. 12 is a flowchart of the operations performed by the image communication device shown in FIG. 11.

Operations on memory transmission by the facsimile machine 5 shown in FIG. 6, the facsimile machine 6 shown in FIG. 7 and the facsimile machine 7 shown in FIG. 8 will be explained with reference to FIG. 10. First, reading of a color draft image is performed (step S310). This reading allows binary image data and color image data to be accumulated simultaneously in a memory unit (step S320). When the draft is one of a plurality of drafts, all drafts are read (step S330) and a communication is started (step S340). After establishment of a connection to the destination facsimile machine, determination is made on whether the destination facsimile machine is a color facsimile machine or a monochromic facsimile machine (step S350).

When the destination facsimile machine is a monochromatic facsimile machine, the brightness data is decoded (step S360), binarized (step S370) and encoded (step S380), and the binary image data is transmitted (step S390). When the destination facsimile machine is a color facsimile machine, on the other hand, the color image data is transmitted (step S410). This transmission is repeated to cover all accumulated images (step S400, S420).

The image communication apparatus of the present invention is not perform alteration of the color space when the image data read by the image reading unit is accumulated in the storage. After the image communication apparatus acquires information on the color space processing capability of the destination image communication device, the image communication apparatus of the present invention performs alteration of the color space according to the processing capability of the destination image communication device. Therefore, the color space conversion is required only once in any cases. This is effective to minimize occurrences of image quality deterioration due to color space conversion operational errors.

In particular, on memory transmission, the image communication apparatus acquires information on the color space processing capability of the destination image communication device when it confirms a connection. Therefore, the color space conversion is required only once in any cases. This is effective to minimize occurrences of the image quality deterioration due to color space conversion operational errors.

The present invention is applicable to the Internet facsimile machine that can exchange the capability at the time of connection. In this case, it is possible in real-time to exchange capability information with the destination at the time of connection and convert the color space after connection, when required, followed by transmission. Alternatively, it is possible to exchange capability information with the destination at the time of connection, followed by transmission of monochromic images that have been created before connection, when required.

According to the present invention, binary image data is encoded at the standard compressibility for monochromic facsimile transmission and encode color image data at the standard compressibility for color facsimile transmission. This is effective to prevent occurrences of the image quality deterioration due to JPEG compression when only binary image data is fetched from the memory unit in the image communication apparatus and transmitted to the destination image communication device.

According to the present invention, the compressibility for brightness data is set lower than that for use in normal transmission. This is effective to lower the degree of the image quality deterioration in the brightness data and improve the image quality even when the brightness data is binarized for transmission to monochromic terminal equipment. In addition, the present invention is operative to perform reversible compression of the brightness data to eliminate the image quality deterioration due to coding of the brightness data. This is effective to improve the image quality even when the brightness data is binarized for transmission of binary images to monochromic facsimile machines.

According to the present invention, the brightness data at the highest resolution that is higher than a resolution required for color communications is accumulated in consideration of communications of the binary image after binarization of the brightness data. Therefore, it is possible to transmit high-quality images even when the destination is such terminal equipment that can only receive binary images.

The present document incorporates by reference the entire contents of Japanese priority documents, 2001-261678 filed in Japan on Aug. 30, 2001, 2001-261679 filed in Japan on Aug. 30, 2001 and 2002-213787 filed in Japan on Jul. 23, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image communication apparatus, comprising:
   a communication unit that establishes a communication with a destination device;
   a transmission image generation unit that establishes communication with the destination device through the communication unit, receives capability data from the destination device that indicates color space processing capability of the destination device, performs color space conversion to convert image data stored in an image storage unit to generate data that corresponds to the color space processing capability of the destination device; and
   a transmission unit that transmits the data generated by the transmission image generation unit to the destination device through the communication unit.

2. The image communication apparatus according to claim 1, wherein the transmission image generation unit does not perform the color space conversion before establishing a connection with the destination device and performs the color space conversion after a connection with the destination device and when it is determined that the color space of the data stored in the image storage unit does not correspond with that of the destination device.

3. The image communication apparatus according to claim 1, wherein the transmission image generation unit converts the data stored in the image storage unit into a plurality of color spaces.

4. The image communication apparatus according to claim 1, wherein the transmission image generation unit has a color space selection function for selecting a color space corresponding with the color space processing capability of the destination from the color spaces.

5. The image communication apparatus according to claim 1, wherein the transmission image generation unit has a function for converting the color draft image in RGB color space read by the image reading unit into image data in LAB space or sRGB color space.

6. An image communication apparatus, comprising:
   a communication unit that establishes a communication with a destination device;
   a transmission image generation unit that generates a binary image from image data stored in an image storage unit before establishing a connection with the destination device; and
   a transmission unit that transmits the binary image generated by the transmission image generation unit to the destination device through the communication unit.

7. The image communication apparatus according to claim 6, wherein the transmission image generation unit is operative to perform color space conversion of the color draft image stored in the image storage unit when the color draft image is read by the image reading unit, the transmission image generation unit having a binary coding function for generating binary image by coding a brightness component in the color image at a certain compressibility before connection to the destination.

8. The image communication apparatus according to claim 7, wherein the image storage unit stores the brightness and color components of the color draft image, and
   the transmission image generation unit generates the binary image based on the brightness component.

9. The image communication apparatus according to claim 8, wherein when storing the brightness and the color components, the brightness component is less compressed as compared with the color component.

10. The image communication apparatus according to claim 9, wherein, when the destination device is provided with a color output capability, the transmission image generation unit increases compressibility of the brightness component and color component to same level and synthesizes both components.

11. The image communication apparatus according to claim 9, wherein the transmission image generation unit encodes the color component by applying irreversible compression and encodes to the brightness component by applying reversible compression.

12. The image communication apparatus according to claim 8, wherein resolution of the brightness component is set higher than that of the color component.

13. The image communication apparatus according to claim 12, wherein, when the destination device is provided with a color output capability, the transmission image generation unit decreases the resolution of the brightness component so as to be the same as that of the color component and synthesizes both components.

14. The image communication apparatus according to claim 6, wherein the transmission image generation unit does not perform the color space conversion when color draft image is read by the image reading unit, and the transmission image generation unit has a binary coding function for generating the binary image based on a brightness component of the color draft image.

15. The image communication apparatus according to claim 14, wherein the image storage unit stores the brightness and color components of the color draft image, and
the transmission image generation unit generates the binary image based on the brightness component.

16. The image communication apparatus according to claim 15, wherein when storing the brightness and the color components, the brightness component is less compressed as compared with the color component.

17. The image communication apparatus according to claim 16, wherein, when the destination device is provided with a color output capability, the transmission image generation unit increases compressibility of the brightness component and color component to same level and synthesizes both components.

18. The image communication apparatus according to claim 1, wherein the transmission image generation unit encodes the color component by applying irreversible compression and encodes to the brightness component by applying reversible compression.

19. The image communication apparatus according to claim 15, wherein resolution of the brightness component is set higher than that of the color component.

20. The image communication apparatus according to claim 19, wherein, when the destination device is provided with a color output capability, the transmission image generation unit decreases the resolution of the brightness component so as to be the same as that of the color component and synthesizes both components.

21. The image communication apparatus according to claim 6, further comprising a selection unit that selects either a monochromic image or a colored image to be transmitted by the transmission unit when the destination device has a capability to process both the monochromic and the colored images.

22. An image communication apparatus, comprising:
communication means for establishing a communication with a destination device;
transmission image generation means for establishing communication with the destination device through the communication means, receiving capability data from the destination device that indicates color space processing capability of the destination device, performing color space conversion to convert image data stored in an image storage unit to generate data that corresponds to the color space processing capability of the destination device; and
transmission means for transmitting the data generated by the transmission image generation means to the destination device through the communication means.

23. An image communication apparatus, comprising:
a communication means for establishing a communication with a destination device;
a transmission image generation means for generating a binary image from image data stored in an image storage unit before establishing a connection with the destination device; and
a transmission means for transmitting the binary image generated by the transmission image generation means to the destination device through the communication means.

24. An image communication method, comprising:
making an image storage unit store data related to a color draft image read by an image reading unit;
establishing connection with a destination device;
receiving capability data from the destination device that indicates color space processing capability of the destination device;
performing color space conversion to convert the data stored in the image storage unit to generate data that corresponds to the color space processing capability of the destination device; and
transmitting the generated data to the destination device.

25. An image communication method, comprising:
making an image storage unit store data related to a color draft image read by an image reading unit;
generating a binary image from the data stored in the image storage unit; and
establishing connection with a destination device;
transmitting the generated binary image to the destination device.

* * * * *